START-STOP TELEGRAPH REGENERATORS
Filed Aug. 16, 1954
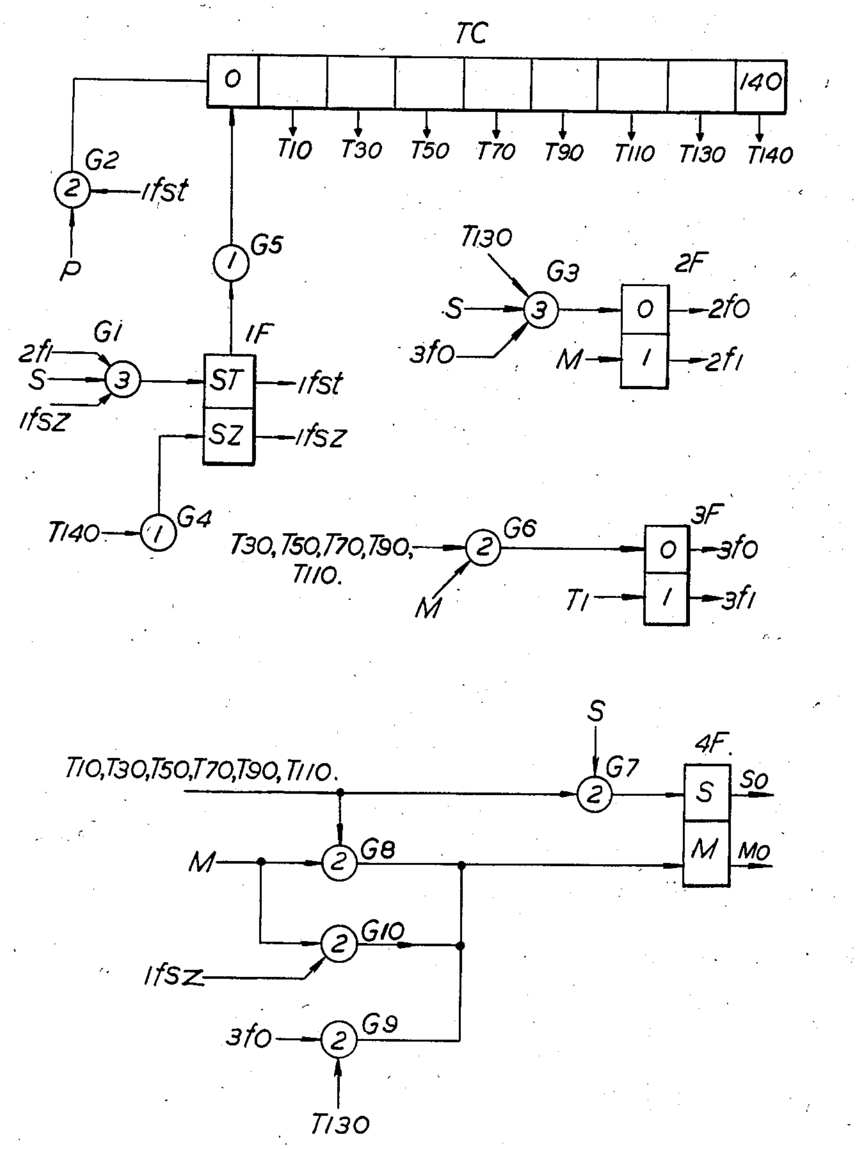
Inventors
V. J. TERRY
D. A. WEIR
N. F. FOSSEY
By Robert Harding Jr.
Attorney United States Patent Office 2,822,422

Patented Feb. 4, 1958

2,822,422

START-STOP TELEGRAPH REGENERATORS

Victor John Terry, Donald Adams Weir, and Nigel Frederick Fossey, London, England, assignors to International Standard Electric Corporation, New York, N. Y.

Application August 16, 1954, Serial No. 450,011

Claims priority, application Great Britain August 17, 1953

4 Claims. (Cl. 178—70)

This invention relates to electronic regenerative telegraph repeaters for start stop codes.

In such regenerators a time scale circuit of some kind is used to measure off intervals at which the condition of an incoming line is examined and this condition repeated into the outgoing line. Synchronism between the station from which the signals are being received and the time scale circuit of the repeater is dependent upon the time scale circuit being started from a convenient zero position upon the receipt of the start element of a signal combination and being restored (to await another start element) after the stop element has been examined. A start element is usually a space or no-current condition.

In receiving telegraph signals over circuits liable to interference, for example over radio circuits, a start element may fail to arrive and the time scale circuit will be started up by a received spacing condition which is in fact one of the significant spacing elements in a signal combination. In such a case lack of synchronism results and a number of characters may be printed incorrectly until synchronism is regained.

The present invention has for its object a means for restoring synchronism quickly. To this end the condition of the incoming line is examined during the nominal stop element period, when the condition of the incoming line should be mark. If there is lack of synchronism there is an even chance of the condition being found to be space and if so found the time scale circuit after being restored to zero is not restarted until a subsequent mark to space transition occurs.

It has been found that with this provision synchronism between the distant station and the repeater is quickly restored and the number of characters wrongly printed is minimised.

When the time scale circuit is restored to zero the condition of the line outgoing from the repeater may be forcibly driven to mark. The automatic insertion in the outgoing signal of a stop element irrespective of the condition of the incoming line is itself known and is known as forced stop insertion. It has been described and claimed in our earlier British Patents 692,411, 692,456 and 692,457, and in British Patent 653,867.

In the last mentioned patent there is also described means for suppressing the automatic application of the stop element to the outgoing line when a long space signal is received on the incoming line. In the regenerator therein described, a multivibrator circuit is arranged to apply conditioning impulses to an electronic switching circuit under control of a character timing circuit. If a spacing condition persists from the commencement of a start element for a period of 130 milliseconds, the character timing circuit is prevented from restoring to normal until the conclusion of a continuous space, i. e. until mark is again received. Only then is the outgoing line restored to mark.

These arrangements are solely concerned with the regeneration of a long space condition and there is no provision for making the restart of the time scale circuit depend upon a mark to space transition in the case of lack of synchronism. Indeed, in the conditions described, the time scale circuit is held away from the zero condition during the receipt of a long space.

According to one feature of the present invention an electronic regenerative telegraph repeater for start-stop codes comprises an incoming signal line and an outgoing signal line, a time scale circuit, means for starting said time scale circuit upon the initial appearance of a spacing condition on said incoming signal line, means for examining the condition of said incoming signal line at intervals under control of said time scale circuit and for repeating each condition into said outgoing line, means for restoring the time scale circuit to an initial position after an examination of the incoming signal line during the period when a stop element should be present at the end of a character and means, operative when a spacing condition is found to be present during such last mentioned examination for preventing the restart of said time scale circuit until a mark to space transition is received on said incoming signal line.

The arrangements according to the present invention may be combined with forced stop insertion, since this assists in synchronism between the regenerator and any distant station to which signals are transmitted from the regenerator.

An embodiment of the invention will be further described in conjunction with the accompanying drawing which shows the essential parts of a regenerative repeater as described in said British Patent No. 692,411, modified to carry out the present invention, including also facilities for forced stop insertion and long space transmission.

In order to simplify the description and the accompanying drawing as much as possible the drawing is functional in nature, each symbol used standing for a device performing a particular function, the physical nature of the device and its manner of performing the function being well known.

Gate circuits are denoted by a circle the reference G being applied to each. A numeral within the circle denotes the number of inputs required to open the gate and thus furnish an output. Two position switches are denoted by the letter 1F, 2F &c., the different positions being denoted by rectangles within which different numerals or letters appear. There are all to be considered as static electric switches and may take the form of two cold cathode gas filled tubes interconnected so that when one is fired the other is extinguished. When one of the tubes is conducting it supplies a potential to an output conductor. This output conductor is shown also in relation to the device to which it supplies an input and denoted by a numeral and lower case reference letters. Thus the switch 1F consists of two interconnected tubes marked ST and SZ and the outputs from these respective tubes are marked 1*fst* and 1*fsz* respectively and supply inputs to gates G2 and G1 respectively. The switch 1F supplies a momentary output over the conductor shown vertically from the top of ST leading to the input of gate G5 whenever the switch 1F changes over from one condition to another.

TC denotes a counting circuit which may take the form of that described in British Patent No. 692,411 and controls the application of potentials to various other circuits at various times in the time scale of counting. The counting circuit counts pulses from a 5 kc./s. source of pulses applied over a conductor marked P.

A speed of signalling of 50 Bauds is assumed and also the use of a start-stop code of start element, five significant elements and a stop element of equal duration to that of the start element or each of the other elements. Hence a signal combination lasts for 140 milliseconds.

The line for incoming signals (not shown) is connected to a modulator in the same manner as in the last above mentioned patent. Pulses from the same 5 kc./s. source as are counted by the counting chain TC, are applied to this modulator and appear on mark and space leads in the manner described in the last above mentioned patent. Conductors connected to these leads are denoted M and S respectively in the drawing.

For the stop condition (mark) switch 1F is initially in condition such that SZ is operative and 2F in condition such that 2F1 is operative. Switch 4F is initially in condition such that 4FM is operative. Switches 1F and 2F supply inputs *1fsz* and *2f1*, respectively to a gate G1, another input to the gate being supplied by conductor S.

When a start element arrives pulses appear on conductor S and gate G1 opens. Switch 1F is operated to condition ST and supplies a potential of an input to gate G2 which opens to allow pulses from P to operate the counting chain TC. At the same time the momentary potential generated on the change over of 1F acts through gate G5 to reset the counting chain to position 0 if it were not already in that position.

Pulses from P are thereupon counted by TC which supplies potentials at given times. Conductors upon which these potentials appear are denoted by T followed by figures which indicate the times in milliseconds at which these potentials appear.

The condition of the mark and space leads are examined at times 10, 30, 50, 70, 90 and 110 milliseconds by gates G7 and G8 and the conditions found are repeated to the outgoing lines MO, SO, by operating the two-condition switch 4F to condition M or condition S respectively. If forced stop insertion is not provided, the condition of the mark and space leads is also examined at 130 milliseconds at gate G9 and the condition found repeated by operation of switch 4F.

At 140 milliseconds potential is applied to a gate G4 to operate and re-cycle switch 1F into its initial condition SZ. This renders ST inoperative and the supply of pulses from P to the counting chain ceases. At the same time the change over potential applied over gate G5 resets the counting chain to initial position.

The switch 2F is operated to condition 1 whenever a mark appears on the incoming line. If a spacing condition is detected at 130 milliseconds when the condition of the incoming line should be marking, switch 2F is operated to condition 0. This takes place over gate G3 which requires three inputs to open the gate, one *3fo* being derived from switch 3F when in condition 0. For the present it will be assumed that this input to gate G3 is present.

With switch 2F in condition 0, gate G1 cannot be opened because input *2f1* is locking and the time scale circuit cannot be restarted. When a marking condition subsequently appears on the incoming line, a pulse appears on conductor M and operates switch 2F into condition 1. At the same time the output switch 4F is driven into condition M over gate G10 to repeat the marking condition to the outgoing line. On the subsequent appearance of a space on the incoming line, gate G1 is opened to re-start the time scale circuit.

If a spacing condition is present on the incoming line at time T130, the middle of what should be the stop element, this is an indication that synchronism between the transmitter from which signals are being received and the time scale circuit of the regenerative repeater has been lost and the arrangement thus described assists in regaining synchronism quickly.

This is best made clear by means of an example. Suppose a combination SMSSSSM is sent, the first element S being the start element and the last element M being the stop element and further suppose the start element is lost due to interference. The time scale circuit of the regenerative repeater will then be started by the first spacing element in the character i. e. 40 milliseconds late. The character read by the regenerator and retransmitted will be SSSSMSX where the sixth element in the last-mentioned character S is the start element of the following character and the following element X may be mark or space. If, and only if, X is a space the invention assists in regaining synchronism. In such case the regenerator stops and does not immediately restart. If the following character be SSSSSSM, SSSSSMM, SSSSMMM, SSSMMMM or SSMMMMM this character will be the only character lost as the regenerator time scale circuit will start again in synchronism on the start element following the last mark. With other combinations the time scale circuit will restart with the loss of one or more elements and the character will be mutilated. Again there will be an even chance whether the time scale circuit will be brought to a condition to await a mark to space transition, and synchronism will quickly be restored.

From the theoretical point of view it may seem that, if interference causes the stop element to appear as a space, the invention can be damaging. It must be noted, however, that if this space persists over the period of the following start element the regenerator is likely to be thrown out of synchronism whether with or without the arrangements of the invention. Without the invention the time scale circuit would in such circumstances start again too early, with the invention it starts again too late. Prolonged tests have shown that overall the invention results in a substantial improvement in that the number of characters wrongly printed when working under severe conditions was reduced by 50% by the use of the invention.

If forced stop insertion is required, gate G10 is omitted, the examination of the incoming line by gates G7 and G8 at 130 milliseconds is omitted as shown and a gate G9 is provided over which switch 4F is forcibly driven to mark at 140 milliseconds. Gate G9 a two input gate and receives an input pulse at time T130 and also receives an input *3fo* from switch 3F which is in the 0 position.

If the facility of repeating a long space is also to be provided the forcible insertion of mark at 130 milliseconds must be prevented during the receipt and retransmission of a long space and the bringing of the time scale circuit to rest on a spacing condition being detected at 130 milliseconds must in those circumstances be prevented.

For these purposes switch 3F is provided. This switch is set into condition 1 at time T 1 millisecond in each cycle of the time scale circuit. The condition of the mark lead is examined at 30, 50, 70, 90 and 110 milliseconds, i. e. at the middle point of each of the character elements and if a marking condition is detected at any one of those times switch 3F is driven into position 0. The driving of switch 2F into position 0 over gate G3 and the forcible insertion of a mark over gate G9 are dependent upon switch 3F being in condition 0.

If a long space is received switch 3F remains in condition 1 and switch 4F at *4fs* continues to repeat a spacing condition into the outgoing line. Switch 2F remains in position 1. The time scale circuit continues to run. At 140 milliseconds switch 1F is driven into condition SZ via gate G4, the time scale circuit TC is restored to zero position via gate GS and the spacing condition on the incoming line drives switch 1F into condition ST and restarts the time scale circuit from zero position. The time scale circuit continues to run until a marking condition appears on the incoming line. At the end of the cycle in which that occurs switch 1F is restored to condition SZ and the switch 4F is driven into condition M over gate G10. If the incoming line restores to mark before 110 milliseconds in a cycle, switch 3F is driven to 0 via gate G6, and at 130 milliseconds switch 4F is driven to condition M via gate G9. The circuit then awaits the arrival of a space in the ordinary way.

While the principles of the invention have been described above in connection with specific embodiments, and particular modifications thereof, it is to be clearly understood that this description is made only by way of example and not as a limitation on the scope of the invention.

What we claim is:

1. An electronic regenerative telegraph repeater for start stop codes comprising an incoming signal line and an outgoing signal line, a time scale circuit, means for starting said time scale circuit upon the appearance of a start condition on said incoming signal line, means for examining the condition of said incoming signal line at intervals under control of said time scale circuit and for repeating each condition into said outgoing line, means for examining the incoming signal line during the period when a stop element should be present, means for restoring the time scale circuit to an initial position after the said last mentioned examination and means operative when a spacing condition is found on said last examination for preventing the restart of said time scale circuit until a mark to space transition is received on said incoming line.

2. An electronic regenerative telegraph repeater for start stop codes comprising an incoming signal line and an outgoing signal line, a time scale circuit, means for starting said time scale circuit upon the appearance of a start condition on said incoming signal line, means for examining the condition of said incoming line at intervals under control of said time scale circuit and for repeating each condition into said outgoing line, means for examining said incoming line at an interval during the nominal stop element, means for restoring the said time scale circuit into an initial position at an interval after the lapse of a period from said start condition equal to the length of a signal combination, means operative when a spacing condition is found at either of said last-mentioned intervals for restarting said time scale circuit into operation and means operative when a spacing condition is found on examination during the stop element and a marking condition is found in at least one of the preceding intervals for preventing the restart of said time scale circuit until a mark to space transition is received on said incoming line.

3. An electronic regenerative telegraph repeater as claimed in claim 2 in which means is provided for repeating the condition of the incoming line found on said last examination into said outgoing line.

4. An electronic regenerative telegraph repeater as claimed in claim 1 in which means is provided for sending a stop element into the outgoing line irrespective of the condition of the incoming line found on said last examination.

No references cited.